(12) United States Patent
Horiuchi et al.

(10) Patent No.: US 6,378,504 B1
(45) Date of Patent: Apr. 30, 2002

(54) REDUCED VIBRATION FUEL SUPPLY SYSTEMS

(75) Inventors: Tadao Horiuchi; Nobuo Suzuki; Takashi Nagai, all of Obu (JP)

(73) Assignee: Aisan Kogyo Kabushiki Kaisha, Obu (JP)

( * ) Notice: Subject to any disclaimer, the term of this patent is extended or adjusted under 35 U.S.C. 154(b) by 0 days.

(21) Appl. No.: 09/558,850

(22) Filed: Apr. 27, 2000

(30) Foreign Application Priority Data

Jun. 10, 1999 (JP) .......................................... 11-164094

(51) Int. Cl.[7] .............................................. F02M 37/04
(52) U.S. Cl. ....................................... 123/509; 417/463
(58) Field of Search ................................. 123/509, 497, 123/510, 511; 417/463, 423.3; 248/638

(56) References Cited

U.S. PATENT DOCUMENTS

| 4,768,925 | A |   | 9/1988 | Geupel |         |
|-----------|---|---|--------|--------|---------|
| 5,046,471 | A |   | 9/1991 | Schmid |         |
| 5,219,629 | A | * | 6/1993 | Sobolev | .................... 428/35.9 |
| 5,392,750 | A |   | 2/1995 | Laue et al. |     |
| 5,411,810 | A | * | 5/1995 | Hirakouchi et al. | ........ 428/480 |
| 5,430,117 | A | * | 7/1995 | Kawasaki et al. | .......... 526/336 |
| 5,820,348 | A | * | 10/1998 | Fricke | ......................... 416/248 |
| 6,062,203 | A | * | 5/2000 | Takahashi et al. | .......... 123/509 |
| 6,073,614 | A |   | 6/2000 | Kleppner |         |

FOREIGN PATENT DOCUMENTS

| DE | 3927218 | 2/1991 |
|----|---------|--------|
| EP | 0379631 | 8/1990 |
| JP | 09032672 | 2/1997 |

* cited by examiner

*Primary Examiner*—Willis R. Wolfe
*Assistant Examiner*—Mahmoud Gimie
(74) *Attorney, Agent, or Firm*—Dennison, Scheiner & Schultz

(57) ABSTRACT

A fuel supply system includes a fuel pump 2 and a housing 1 that are disposed within a fuel tank 6. A damping material 50 is disposed on an upper end portion of a sidewall of the housing 1. The damping material 50 reduces the transmission of vibrations generated by the fuel pump 2 from to the fuel tank 6 to thereby prevent the fuel tank from vibrating. The damping material 50 may include an elastic material having a specific gravity of 0.12 to 0.4. Alternatively, the damping material 50 may include a fuel-resistant paper material.

44 Claims, 20 Drawing Sheets

REDUCED VIBRATION FUEL SUPPLY SYSTEMS

BACKGROUND OF THE INVENTION

1. Field of the Invention

The present invention relates to fuel supply systems, and more particularly, to fuel supply systems that supply fuel to an internal combustion engine of a vehicle and that have additional vibration reduction means.

2. Description of the Related Art

Known fuel supply systems for an internal combustion engine may include a fuel pump, a fuel filter that is disposed around the fuel pump, and a housing that is disposed within a fuel tank for housing the fuel pump and the fuel filter. When such a fuel supply system is installed in a vehicle, vibrations generated in the fuel pump may be transmitted to the fuel tank via the fuel filter, the housing, and fuel within the fuel tank. When vibrations generated in the fuel pump are transmitted to the fuel tank, the fuel tank may vibrate and produce vibration noises. Naturally, a correlation exists between fuel tank vibration and the overall noise produced by the vehicle. Thus, reduction of noises emanating from the fuel supply system has been a long-felt need in the field in order to further reduce noise generated by the vehicle.

SUMMARY OF THE INVENTION

It is, accordingly, an object of the present invention to reduce or prevent vibrations that are generated by the fuel pump from being transmitted to the fuel tank to thereby prevent the fuel tank from vibrating.

In one aspect of the present teachings, a damping material is disposed on sidewall of a fuel pump housing. The fuel pump and housing are then disposed within the fuel tank. The damping material effectively reduces the amount of fuel tank vibration or prevents the fuel tank from vibrating as a result of vibrations generated by the fuel pump.

In another aspect of the present teachings, the damping material is preferably disposed at the location on the housing in which the housing vibrations are the greatest. If the fuel pump is disposed vertically within the housing along the inner periphery thereof, the vibrations are generally the greatest in the upper end portion of the housing. Accordingly, in such a case, the damping material is preferably disposed in the upper end portion of the housing.

In another aspect, the damping material may include an elastic material having a specific gravity of about 0.12 to about 0.4 grams/cubic centimeters. Rubber foam is considered to be an appropriate elastic material.

Moreover, the damping material may include a fuel-resistant paper material, such as filter paper that is ordinarily utilized in fuel filters to filter the fuel. The damping material can be formed superimposing a plurality of sheets of the paper material one on another or by folding sheets of the paper material two or more times.

Additional objects, features and advantages of the present invention will be readily understood after reading the following detailed description together with the accompanying drawings and the claims.

DETAILED DESCRIPTION OF THE INVENTION

Figure 1:
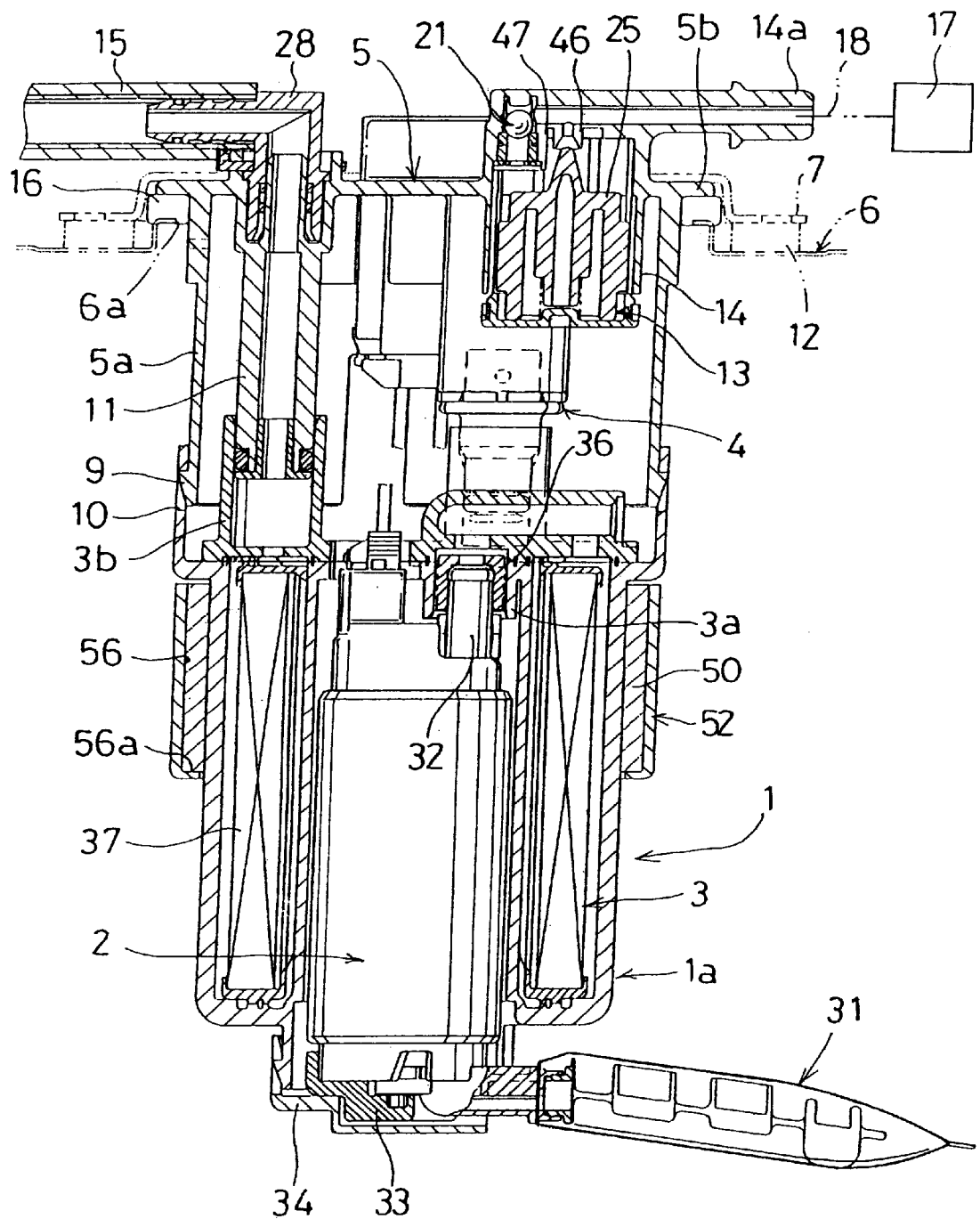
FIG. 1 is a sectional side view showing a first representative embodiment.

In order to effectively prevent or reduce the amount of vibrations generated by the fuel pump from being transmitted to the fuel tank, a damping material is preferably disposed on the fuel pump housing. By reducing vibrations emanating from the fuel pump housing, fuel tank vibrations can be reduced. Consequently, noise reduction is possible.

Preferably, the damping material is disposed on the sidewall of the fuel pump housing and the entire fuel pump housing is disposed within the fuel tank. More preferably, the damping material is disposed around an upper portion of the fuel pump housing, at which the greatest vibrations are generated.

The damping material can be easily attached to the housing using a retaining member. Preferably, a snap-fastener can be is used as a means for attaching the retaining member to the housing. Snap-fasteners have an advantage of having a simple construction that permits the retaining member to be easily attached to the housing. In addition or in the alternative, the attaching means may include a mounting recess provided in the inner periphery of the retaining member for holding the damping material. This mounting recess may further facilitate the operation of attaching the damping material to the housing. Naturally, other types of fastening means may be utilized.

The vibration reducing effect that is provided by the damping material varies with the specific gravity of the damping material. As a result, it has been found that damping materials having a specific gravity of about 0.12 to about 0.4 provide remarkably superior vibration reducing effects. Rubber foam is preferably provided as an elastic material having such a specific gravity.

The damping material preferably is durable in a fuel environment. Thus, the damping material may preferably include a fuel-resistant paper material. In this specification, fuel-resistant is intended to mean materials that have been specially treated to resist degradation after long exposure to fuel. That is, a fuel-resistant material should resist degradation even if the fuel-resistant material is disposed in the fuel tank and continuously contacts the fuel.

Fuel resistant paper material can be an inexpensive means for reducing the cost of the damping material. Filter paper that is commonly used in fuel filters is particularly preferable, because such filter paper has been proven to be fuel-resistant, and is thus highly durable.

If the damping material is formed of a paper material, various methods may be utilized to form the damping material. For example, a plurality of sheets may be superimposed one on another to form a lamination. Further, one or more sheets of the paper material may be folded two or more times to form a lamination. Thin fuel-resistant paper material is preferable because the vibration reducing effect of the damping material increases as the number of superimposed sheets increases.

Each of the additional features and constructions disclosed above and below may be utilized separately or in conjunction with other features and constructions to provide improved fuel supply systems and methods for designing and using such fuel supply systems. Detailed representative examples of the present invention, which examples utilize many of these additional features and constructions in conjunction, will now be described in detail with reference to the accompanying drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detail description may not be necessary to practice the invention in the broadest sense, and are instead taught merely to particularly describe some representative examples of the invention.

1. First Representative Embodiment

FIG. 1 is a sectional side view of a fuel supply system of a first representative embodiment, which may be utilized in an internal combustion engine. The fuel supply system of the first representative embodiment is preferably constructed in modules by disposing a fuel pump 2, a fuel filter 3, a pressure regulator 4 and other components within a housing 1. Each module of the fuel supply system is preferably disposed within a fuel tank 6 (mounting portion of which is shown in FIG. 1). The housing 1 preferably includes a housing body 1a and a bracket 5, which will be described in further detail below.

The housing body 1a is preferably made of synthetic resin and may be a generally cylindrical shape and have a bottom portion. The bracket 5 preferably covers an open top of the housing body 1a. The bracket 5 also can be made of synthetic resin and may have a generally cylindrical shape. A bottom portion of the bracket 5 may have an opening. A flange 5b is formed on an upper portion of the bracket 5. The bracket 5 is disposed on the upper surface of the fuel tank 6 via a gasket 16 so as to close an opening 6a formed in the upper surface of the fuel tank 6. The flange 5b is fixed to the upper surface of the fuel tank 6 by a holding plate 7 that is attached to the fuel tank 6 by bolts or other attachment means. A retainer 12 is disposed between the fuel tank 6 and the holding plate 7 and maintains the compressibility of the gasket 16 within a specified range.

A cylindrical inserting portion 5a extends from the underside of the bracket 5 and is adapted to be inserted into the upper edge portion of the housing body 1a. Several sets of corresponding engagement projections 9 and engagement holes 10 are formed circumferentially in the cylindrical inserting portion 5a of the bracket 5 and the upper edge portion of the housing body 1a, respectively. The bracket 5 can be attached to the housing body 1a by inserting the cylindrical inserting portion 5a of the bracket 5 into the upper edge portion of the housing body 1a. After insertion, the upper edge portion of the housing body 1a elastically deforms, so that the engagement projections 9 engage the engagement holes 10. Thus, the bracket 5 can be attached to the housing body 1a in this manner.

A fuel pump 2 is disposed in a vertical position in the center of the housing body 1a. A stay 34 and a rubber cushion 33, which are attached to the housing body 1a, elastically support the fuel pump 2. The fuel pump 2 draws fuel from the fuel tank 6 through a pump inlet filter 31 that is attached to the bottom of the fuel pump 2. The fuel pump 2 then exhausts the fuel at an increased pressure through a fuel exhaust port 32 that is formed in the upper end portion of the fuel pump 2.

A fuel inlet port 3a of the fuel filter 3 is connected to the fuel exhaust port 32 of the fuel pump 2 via a cylindrical rubber cushion 36. The fuel filter 3 is generally cylindrical in this embodiment. The housing body 1a may partially form or define a filter case (not numbered) that is disposed within the fuel filter 3. A filter element 37 is disposed within the filter case. Fuel is filtered by passing the fuel through filter element 37 from the outer peripheral side to the inner peripheral side thereof, and the filtered fuel flows out through a fuel outlet port 3b.

The pressure regulator 4 is disposed on the upper surface of the fuel filter 3. The pressure regulator 4 regulates the fuel pressure of the fuel exhausted from the fuel filter 3 to a predetermined pressure. Preferably, the fuel exhausted by the fuel filter 3 is supplied to an internal combustion engine.

The bracket 5 will now be explained in further detail. A fuel outlet pipe 11, a valve housing 14 for a fuel cutoff valve 13, and a connector (not shown) for the fuel pump 2 are integrally formed with the bracket 5.

The fuel outlet pipe 11 preferably includes a pipe that vertically extends through the bracket 5. A lower end of the fuel outlet pipe 11 is connected to the fuel outlet port 3b of the fuel filter 3 to provide a tight seal. An elbow-connecting pipe 28 is connected to the upper end of the fuel outlet pipe 11 to provide a tight seal. The elbow-connecting pipe 28 is connected to a delivery pipe (not shown) of a fuel injector of the internal combustion engine via a fuel supply line 15.

The fuel cutoff valve 13 is disposed within the valve housing 14 in the bracket 5. The valve housing 14 has a generally cylindrical shape with an open bottom portion. A connecting pipe 14a is integrally formed with the upper wall of the valve housing 14 and extends radially (horizontally as viewed in FIG. 1). The proximal end (the left end as viewed in FIG. 1) of the connecting pipe 14a is closed by a wall portion that is generally continuous with a side wall portion of the valve housing 14. Further, the distal end (the right end as viewed in FIG. 1) of the connecting pipe 14a is connected to a canister 17 by a connecting hose 18.

A seat portion 46 and a cylindrical mounting portion 47 adjacent to the seat portion 46 are integrally formed with the upper wall of the valve housing 14. The seat portion 46 has a generally cylindrical shape and couples the internal space of the valve housing 14 to the connecting pipe 14a. The cylindrical mounting portion 47 has a generally cylindrical shape and is partly defined by the sidewall portion of the valve housing 14. A valve seat is formed in the lower end surface of the seat portion 46. The valve seat has a tapered hole shape and can be opened and closed by a float valve 25 that will be described below.

A relief valve 21 is disposed within the cylindrical mounting portion 47. The relief valve 21 opens when the pressure on the float valve 25 in the valve housing 14 or the pressure within the fuel tank 6 exceeds a predetermined pressure, to thereby prevent the fuel pressure from rising above the predetermined pressure.

The float valve 25 for opening and closing the seat portion 46 is disposed within the valve housing 14. When the vehicle is operating under normal conditions, the float valve 25 opens the seat portion 46 so as to exhaust vaporized gas from the fuel tank 6 to the canister 17 via the seat portion 46, the connecting pipe 14a and the connecting hose 18. On the other hand, when the vehicle has been tilted or rolled over, the float valve 25 closes the seat portion 46 so as to prevent liquid fuel within the fuel tank 6 from flowing out into the canister 17. The fuel cutoff valve 13 may include the float valve 25 and/or other components.

A retaining member 52 retains an elastic material 50, which will be described below in further detail, on the sidewall of the housing body 1a of the housing 1. A mounting portion 1b for mounting a center gauge (a liquid level sensor) (not shown) is formed on the outer surface of the housing body 1a.

Figure 2:
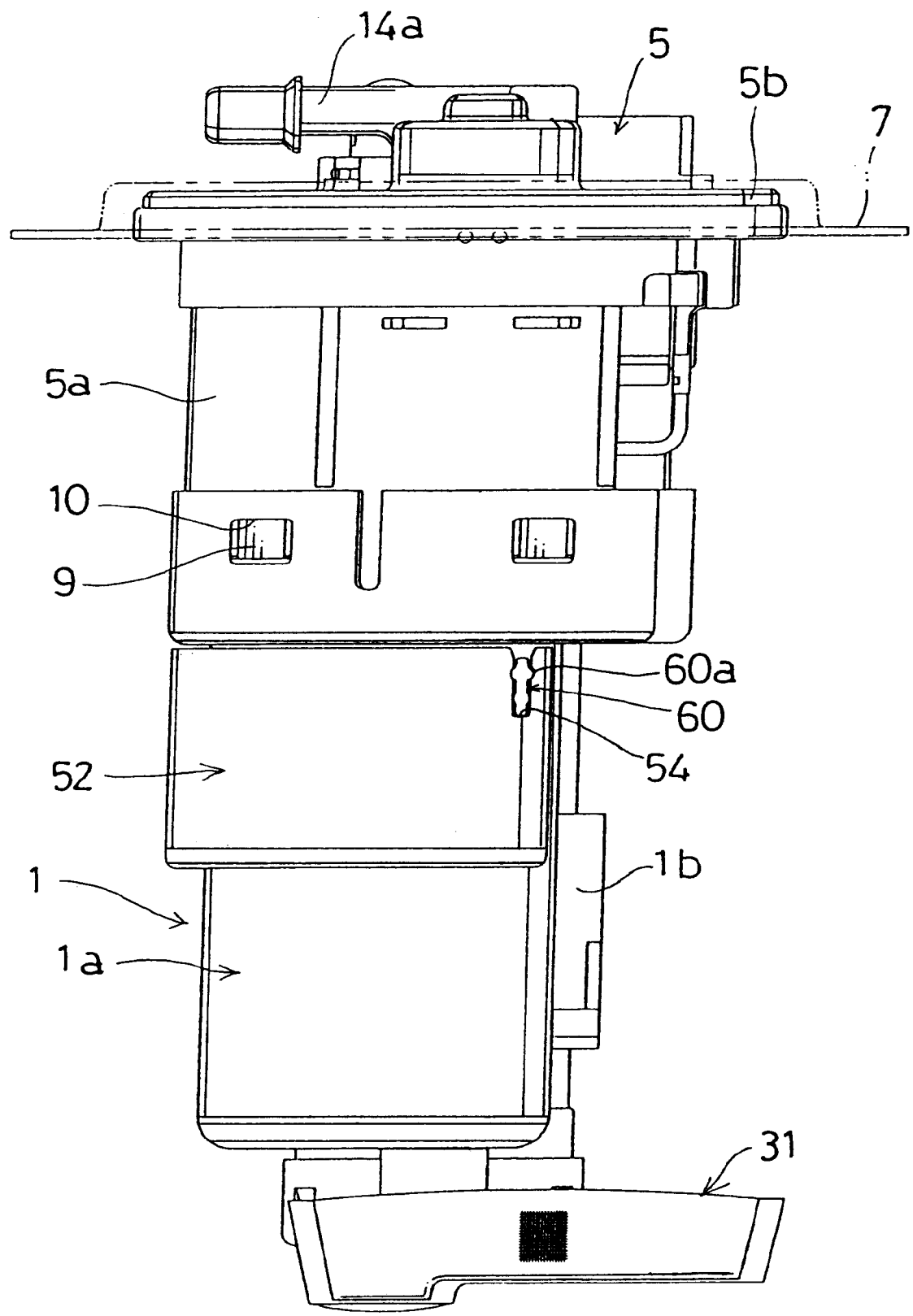
FIG. 2 is a front view showing the first representative embodiment.
Figure 3:
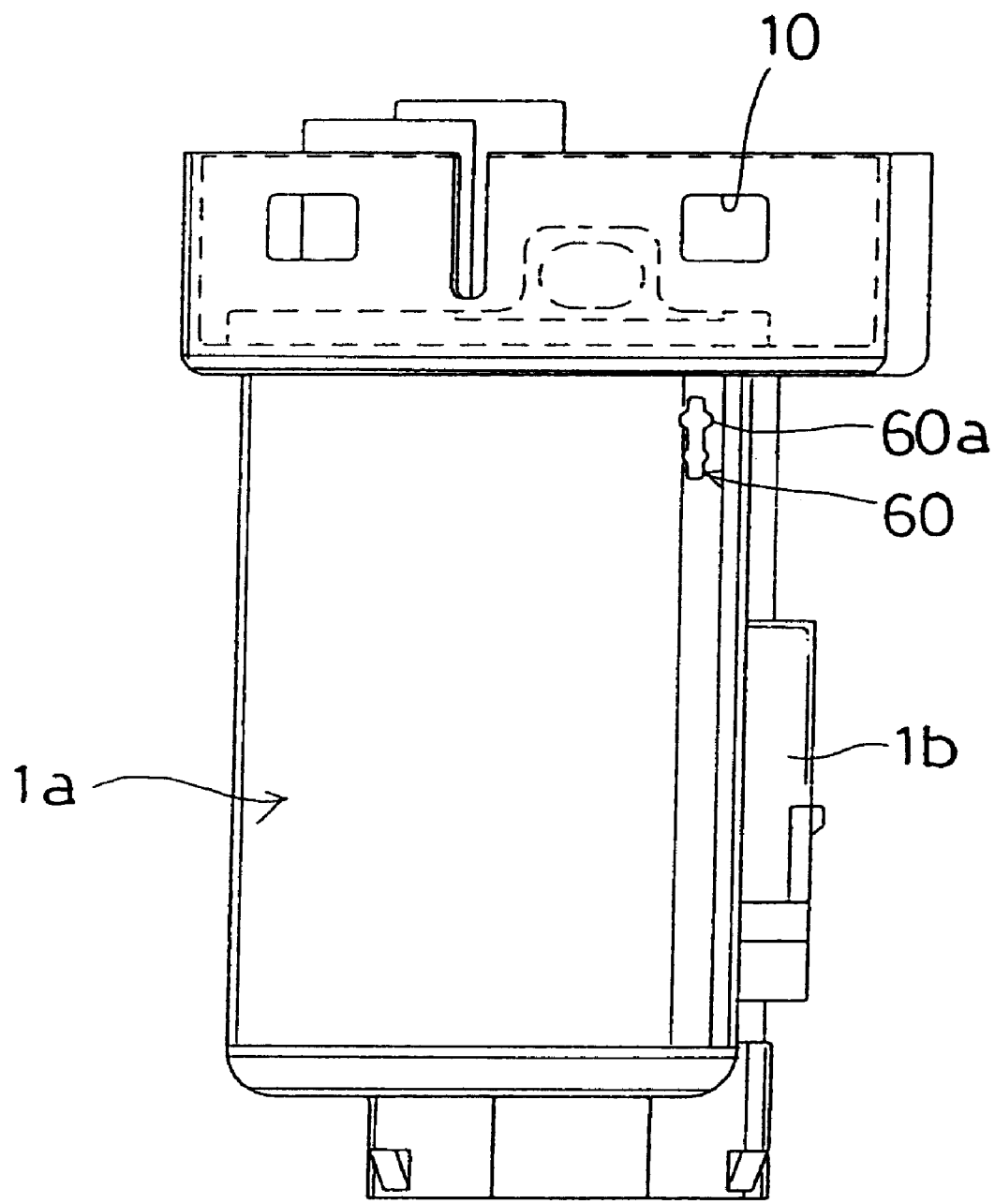
FIG. 3 is a front view of a housing body.
Figure 4:
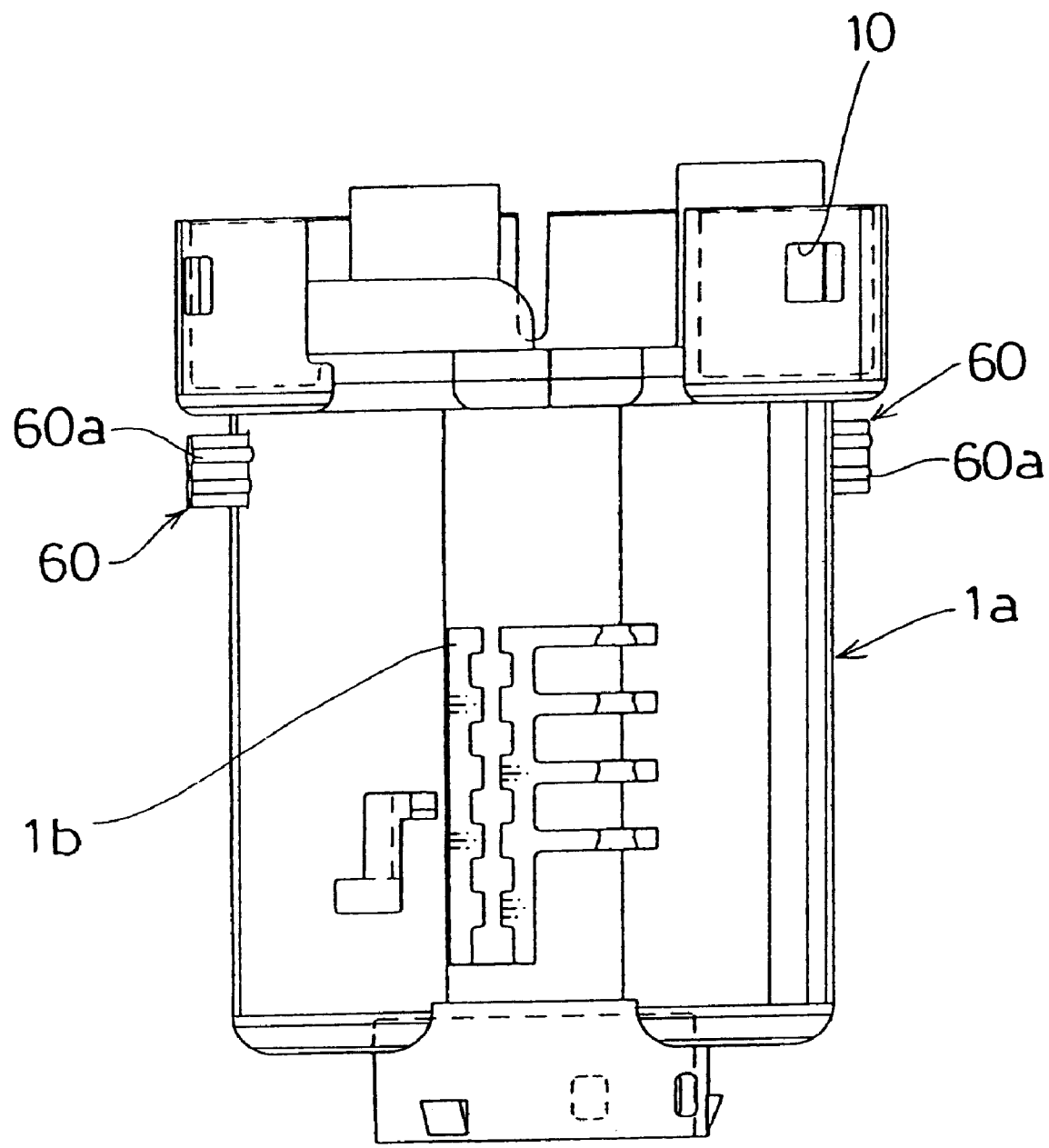
FIG. 4 is a right side view of the housing body.

FIG. 2 is a front view of the fuel supply system of the first representative embodiment, FIG. 3 is a front view of the housing body 1a and FIG. 4 is a right side view of the housing body 1a. Two engagement projections 60 are integrally formed on the upper end portion of the housing body 1a, one on the outer surface near the right end on the front side and the other on the outer surface generally in the center of the back side. Each of the engagement projections 60 has a projecting portion and enlarged portions 60a. The projecting portion has a generally rectangular plate-like shape with a vertically elongated section. The enlarged portions 60a are formed on the upper and lower portions of both sides of the projecting portions and have a generally semicircular cross-section.

Figure 5:
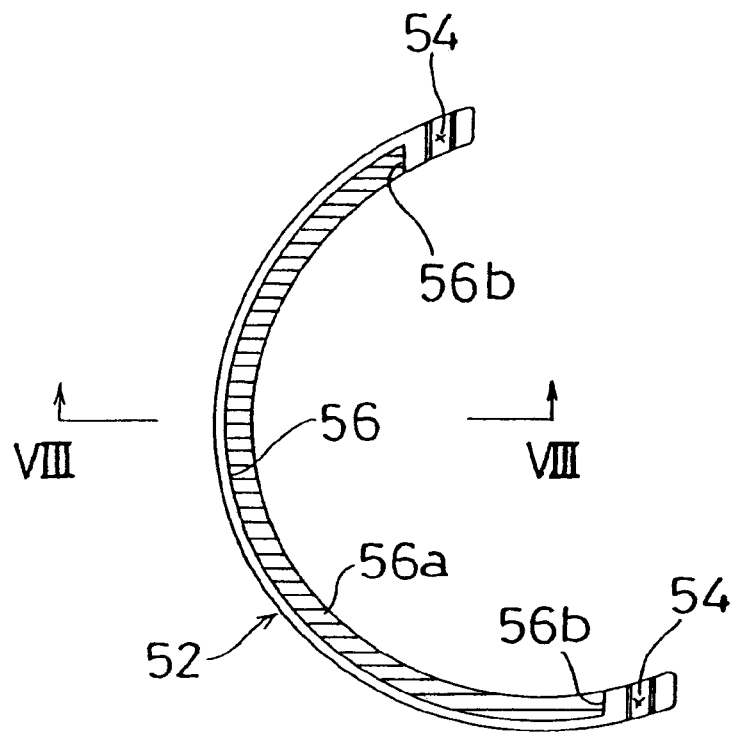
FIG. 5 is a plan view of a retaining member.
Figure 6:
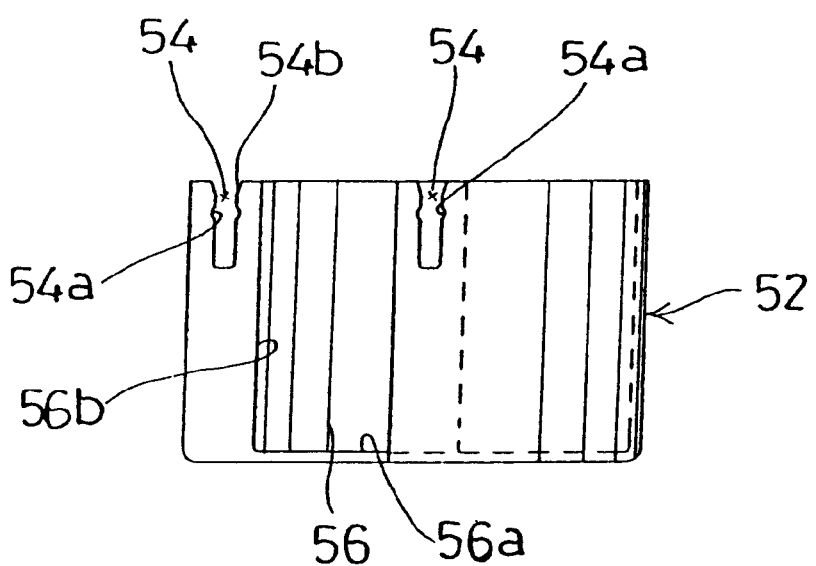
FIG. 6 is a right side view of the retaining member.
Figure 7:
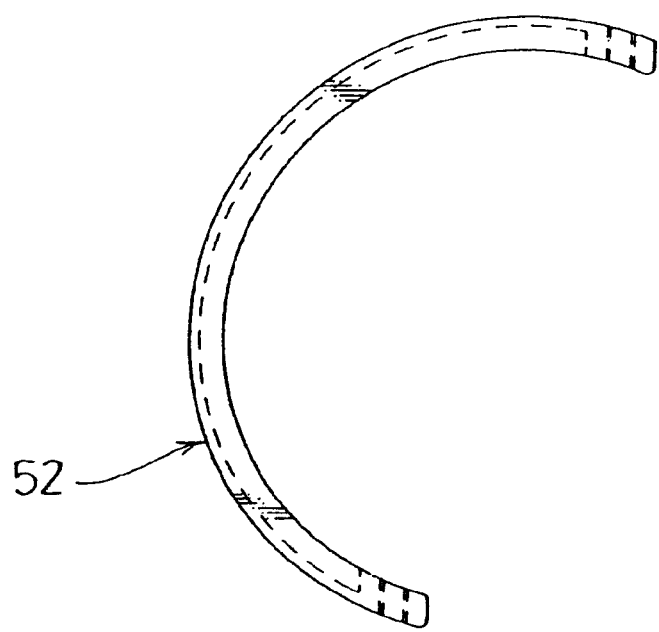
FIG. 7 is a bottom view of the retaining member.
Figure 8:
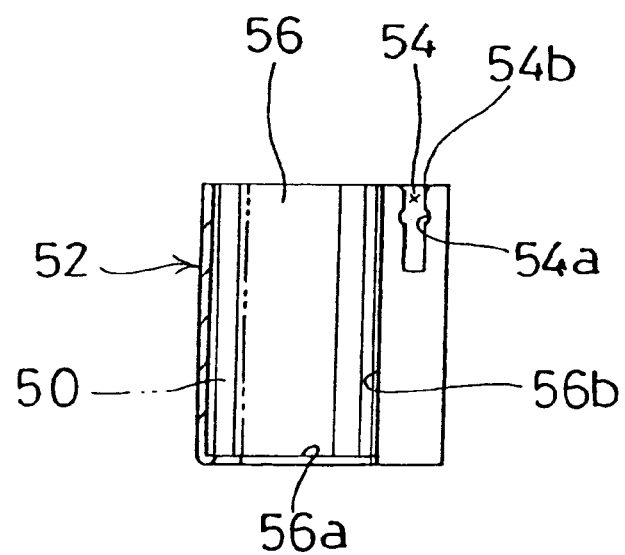
FIG. 8 is a sectional view taken along line VIII—VIII in FIG. 5.

FIG. 5 is a plan view of the retaining member 52, FIG. 6 is a right side view thereof, FIG. 7 is a bottom view thereof and FIG. 8 is a sectional view taken along line VIII—VIII in FIG. 5. The retaining member 52 is preferably made of synthetic resin. The retaining member 52 is preferably bent into a generally circular arc shape and is formed into a generally rectangular plate-like shape. Engagement grooves 54 are preferably formed in both ends of the retaining member 52 and extend downwardly from the upper edge thereof. Each of the engagement grooves 54 preferably has a vertically extending groove and generally semi-circular recesses 54a formed on both sidewalls of the groove 54. A downwardly tapered, inclined guide surface 54b is formed on the upper end of each of the sidewalls of the engagement groove 54. A mounting recess 56 is formed in the interior side of the retaining member 52 and is adapted to receive the elastic material 50 (see FIG. 1). The mounting recess 56 has a bottom surface 56a and a side surface 56b.

The resin material for the housing body 1a, the bracket 5 and the retaining member 52, may be resins, such as polyoxymethylene resin, polyphenylene sulfido resin and polyamide resin, although the type of resin material is not particularly limited. Further, the housing body 1a, the bracket 5 and the retaining member 52 are preferably resin molded, for example, using an injection molding process.

The elastic material 50 may be a generally rectangular rubber foam piece that can be fitted into the mounting recess 56 of the retaining member 52. The rubber foam preferably has a specific gravity, for example, of about 0.12 to about 0.4. The elastic material 50 may be utilized as a damping material.

One representative procedure for attaching the elastic material 50 to the housing body 1a will now be explained. First, the elastic material 50 is mounted in the mounting recess 56 of the retaining member 52 and naturally, various methods are available to mount the elastic material 50 in the mounting recess 56. For example, the elastic material 50 may be adhered to the mounting recess 56, or may be fitted into the mounting recess 56 by utilizing the elasticity of the elastic material 50, or may be simply superimposed on the mounting recess 56.

Next, the retaining member 52 to which the elastic material 50 has been mounted, is positioned along the lower portion of the housing body 1a so that the engagement grooves 54 face the engagement projections 60 in vertical alignment with each other. In this state, the retaining member 52 is moved upwardly relative to the housing body 1a. As a result, the sidewalls of the engagement groove 54 elastically deform, and thus each of the engagement projections 60 engages the associated engagement groove 54. At this time, the enlarged portions 60a of the engagement projection 60 are guided into the engagement groove 54 along the inclined guide surfaces 54b of the engagement groove 54. The enlarged portions 60a are inserted into the engagement groove 54 while the sidewalls of the engagement groove 54 are elastically deformed.

When the lower end of the engagement projection 60 contacts or comes close to the bottom surface 56a of the engagement groove 54, the engagement projection 60 is completely engaged in the engagement groove 54. At this time, the upper enlarged portions 60a of the engagement projection 60 engage the recesses 54a of the engagement grooves 54, and the lower enlarged portions 60a are disposed between the side walls of the engagement groove 54. The engagement projection 60 and the engagement groove 54 are an example of a snap-fastener that is appropriate for these teachings.

By thus attaching the retaining member 52 to the housing body 1a, the elastic material 50 is attached to the housing body 1a (see FIGS. 1 and 2). On the other hand, the engagement projections 60 can be disengaged from the engagement grooves 54 when the retaining member 52 is moved downwardly relative to the housing body 1a so that the side walls of the engagement grooves 54 are elastically deformed.

A representative example of the operation of the above-described fuel supply system for an internal combustion engine will now be explained.

When the engine is operating, the fuel pump 2 draws fuel within the fuel tank 6 through the pump inlet filter 31 and increases the fuel pressure. High pressure fuel is then exhausted from the fuel exhaust port 32 of the fuel pump 2 and supplied to the fuel supply line 14 via the filter element 37 of the fuel filter 3, the fuel outlet port 3b, the fuel outlet pipe 11 and the elbow connecting pipe 28. The fuel pressure can be regulated to a desired pressure by the pressure regulator 4.

When the vehicle is operating under normal conditions, the float valve 25 of the fuel cutoff valve 13 opens the seat portion 46, so that vaporized gas within the fuel tank 6 is exhausted to the canister 17. On the other hand, when the vehicle has been tilted or rolled over, the float valve 25 closes the seat portion 46, so that liquid fuel within the fuel tank 6 is prevented from flowing out into the canister 17.

Further, when the fuel liquid level within the fuel tank 6 is raised and the relief valve 21 closes the seat portion 46, the pressure within the fuel tank 6 may rise. In such a case, the relief valve 21 opens to couple the fuel tank 6 to the connecting pipe 14a, thus preventing the pressure from further rising within the fuel tank 6. Further, when the liquid fuel level within the fuel tank 6 is low and the seat portion 46 is closed by the float valve 25, the pressure within the fuel tank 6 may rise. Also in such a case, the relief valve 21 opens to prevent the pressure from further rising within the fuel tank 6.

In the fuel supply system of the first representative embodiment, the elastic material 50 is provided on the sidewall of the housing 1 as described above. By providing the elastic material 50 on the sidewall of the housing 1, vibrations generated in the fuel pump 2 can be dampened. Thus, vibrations transmitted to the fuel tank 6 are reduced or diminished and the fuel tank 6 does not vibrate as a result of vibrations caused by the fuel pump 2. Therefore, the overall noise level of the vehicle can be reduced.

Changes in the amount of fuel tank vibrations that are caused as a result of vibrations generated by the fuel pump 2 were measured based upon the amount of fuel remaining within the fuel tank 6 (in-tank fuel amount). These measurements were performed for a fuel supply system that utilizes the elastic material 50 and the retaining member 52 that are described above.

Figure 9:
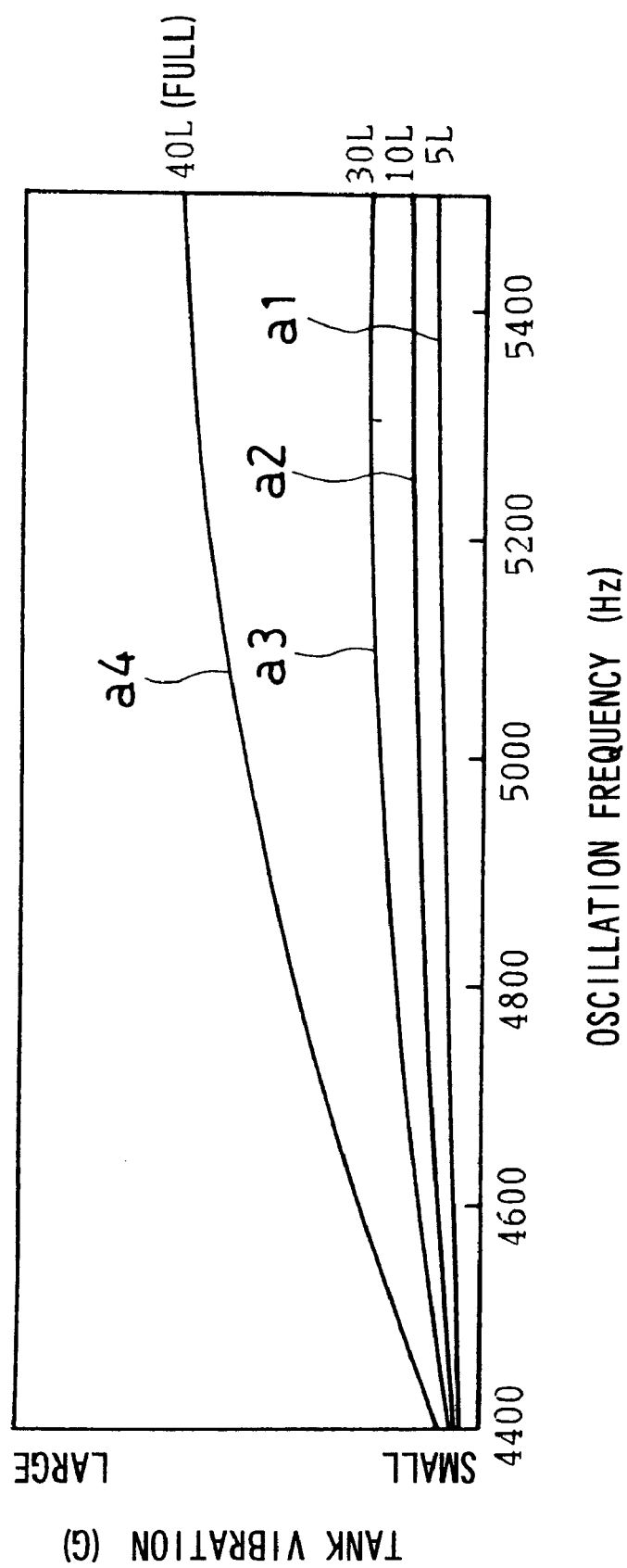
FIG. 9 is a graph showing the results of tank vibration measurements with respect to the amount of fuel within the tank.

These measurement results are shown in FIG. 9. In FIG. 9, the abscissa represents the oscillation frequency (Hz) of the tank vibrations and the ordinate represents the vibration level (G) of the tank vibrations. Characteristic lines a1, a2, a3, a4 show the measurement results when the in-tank fuel amount was 5 liters, 10 liters, 30 liters and 40 liters (full), respectively.

As clearly shown in FIG. 9, the tank vibrations are the greatest when the in-tank fuel amount is 40 liters (i.e., when the tank is full) (see the characteristic line a4), because vibrations from the housing 1 are more easily transmitted to the fuel tank 6 via the in-tank fuel when the tank is full.

Figure 10:
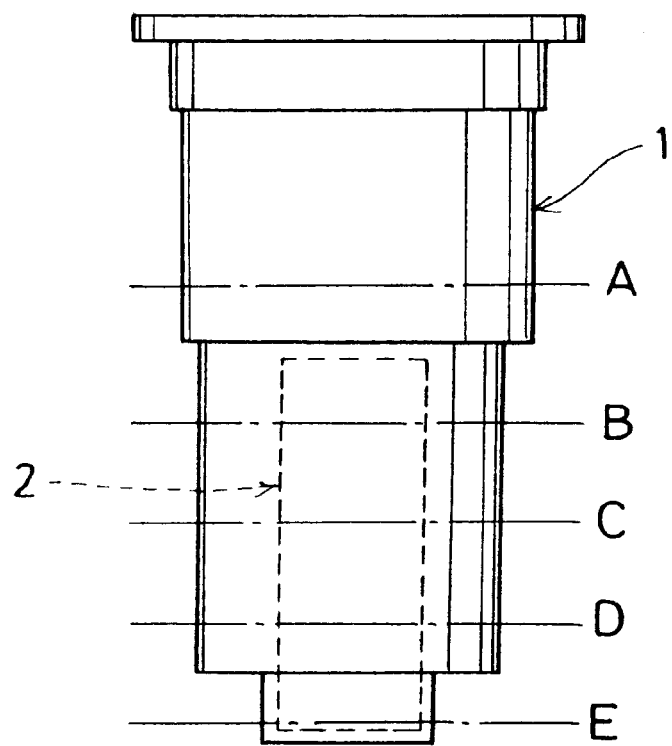
FIG. 10 is a front view showing the positions on the housing in which tank vibration measurements were performed.

The distribution of vibrations in the housing 1 also was measured. In these measurements, vibrations were measured at positions A, B, C, D shown in FIG. 10, for a fuel supply system that did not contain the elastic material 50 and the retaining member 52.

Figure 11:
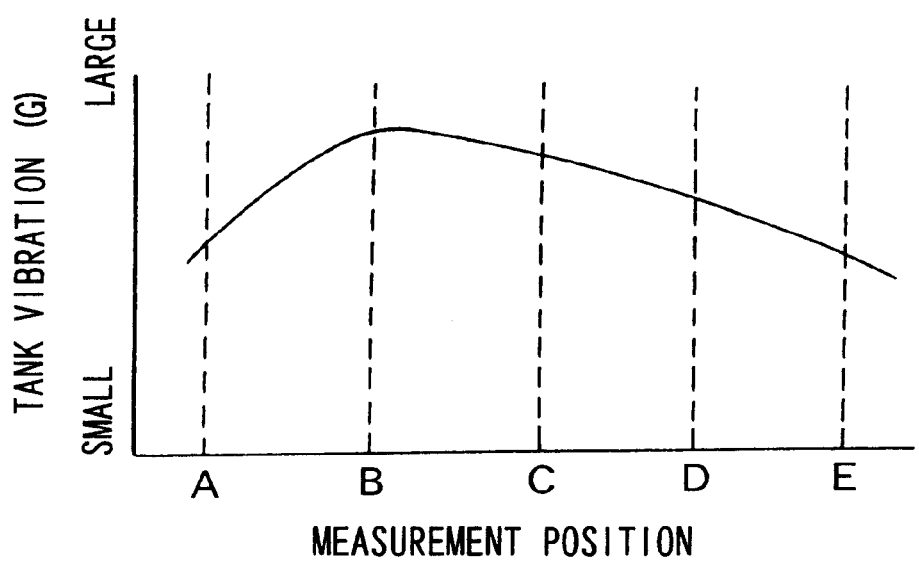
FIG. 11 is a graph showing the distribution of vibrations of the housing.

The measurement results are shown in FIG. 11. In FIG. 11, the abscissa represents the measurement positions for the tank vibrations and the ordinate represents the vibration level (G). As clearly shown in FIG. 11, the vibrations are the greatest at position B, which position is close to the upper end of the fuel pump 2. Based upon this result, the tank vibrations caused by vibrations of the fuel pump 2 can be significantly reduced by providing the elastic material 50 at measurement position B.

Changes in the amount of tank vibrations according to the mounting position of the elastic material 50 were also measured. This measurement was conducted under the conditions in which vibration transmission efficiency is the highest, i.e., the fuel tank is full.

Figure 12:
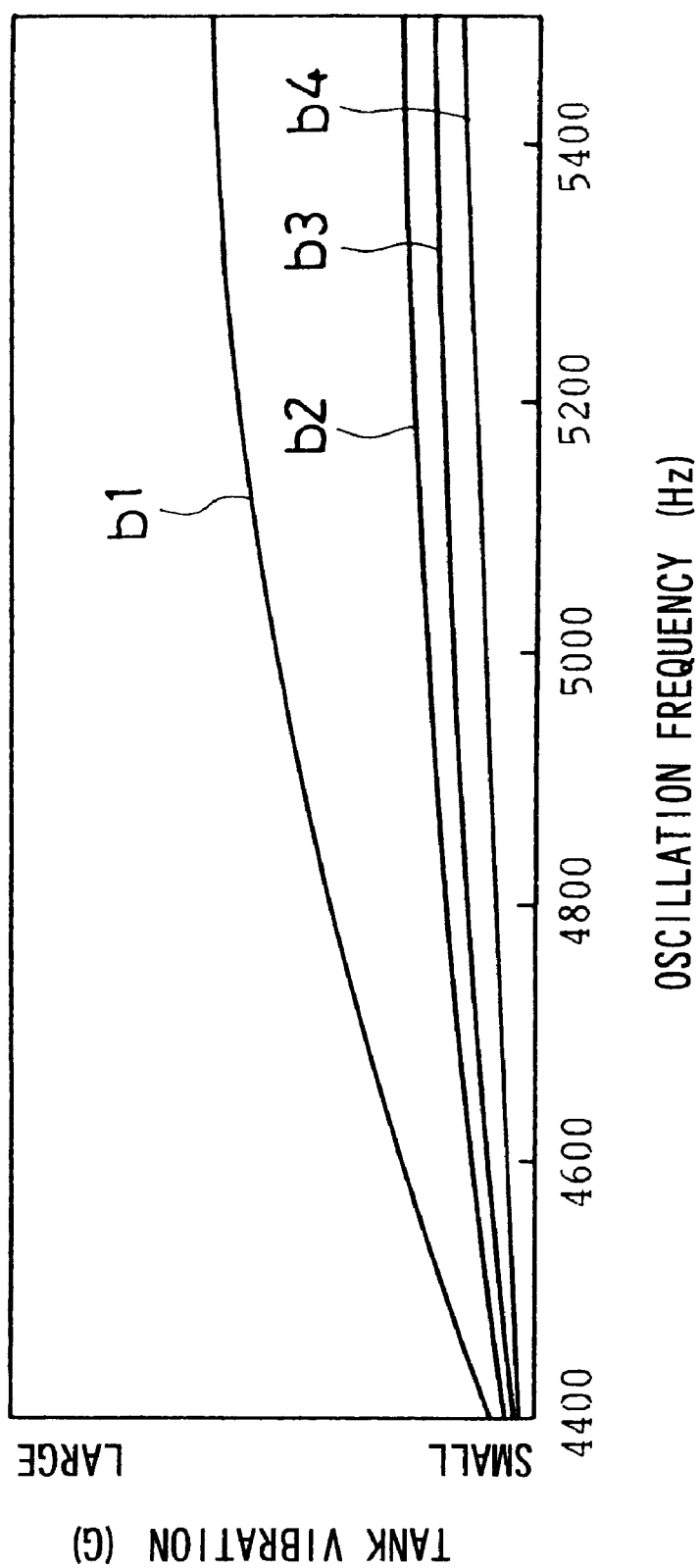
FIG. 12 is a graph showing the results of tank vibration measurements with respect to the mounting positions of the elastic material.

The measurement results are shown in FIG. 12. In FIG. 12, the abscissa represents the oscillation frequency (Hz) of the tank vibrations and the ordinate represents the vibration level (G) of the tank vibrations. Characteristic line b1, represents the measurement results for the condition in which the elastic material 50 is not provided. Characteristic line b2 represents the measurement results for the condition in which the elastic material 50 is provided only at measurement position B. Characteristic line b3 represents the measurement results for the condition in which the elastic material 50 is provided at measurement positions B, C and D. Characteristic line b4 represents the measurement results for the condition in which the elastic material 50 is provided at all the measurement positions A, B, C, D and E. A rubber foam having specific gravity of 0.2 is used as the elastic material 50.

As clearly shown in FIG. 12, vibrations can be effectively reduced when the elastic material 50 is provided only at measurement position B (characteristic line b2). While vibrations can be further reduced when the elastic material 50 is also provided at the other measurement positions C, D, E (characteristic lines b3, b4), the additional reduction in vibration is minimal compared to the large reduction that results by providing the elastic material at position B.

Thus, the elastic material 50 is preferably disposed at the portion of the housing 1 that vibrates the most significantly as a result of vibrations from the fuel pump 2, i.e., measurement position B. Therefore, fuel tank vibration caused by fuel pump vibrations can be effectively reduced.

Further, in this embodiment, the elastic material 50 may have a specific gravity of about 0.12 to 0.4. The reason for this range of preferred specific gravity will now be explained.

Changes in tank vibrations were also measured for elastic materials 50 having different specific gravity values. For these measurements, the elastic materials were mounted in measurement position B.

Figure 13:
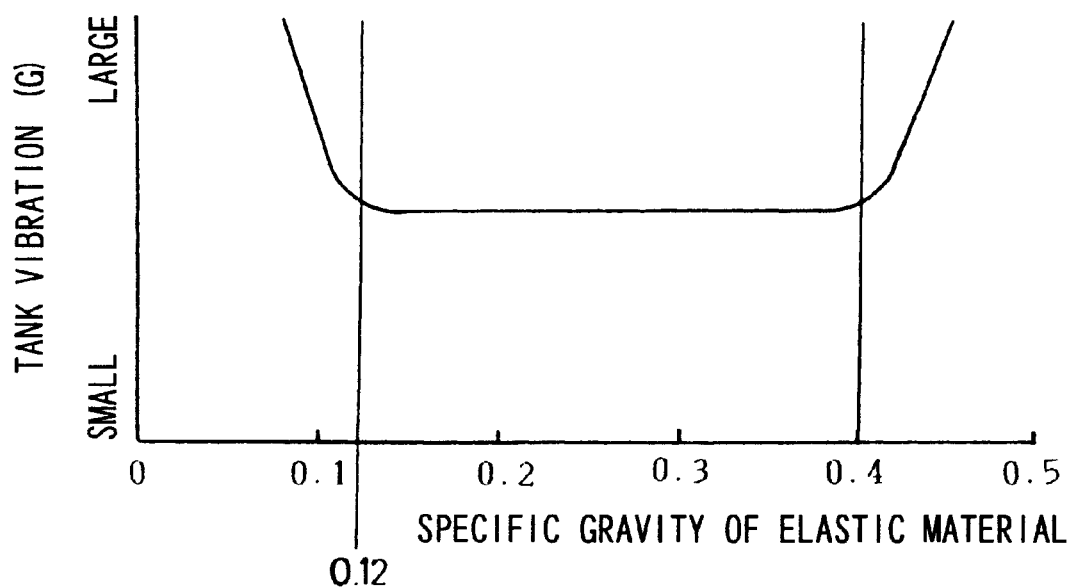
FIG. 13 is a graph showing the results of tank vibration measurements with respect to the specific gravity of the elastic material.

The measurement results are shown in FIG. 13. In FIG. 13, the abscissa represents the specific gravity of the elastic material 50 and the ordinate represents the vibration level (G) of the tank vibrations. As clearly shown in FIG. 13, the tank vibrations are the smallest when the specific gravity of the elastic material 50 is between about 0.12 and 0.4. Consequently, it was proven that fuel tank vibrations of caused by fuel pump vibrations can be greatly reduced by using elastic materials 50 having a specific gravity in the range of about 0.12 to about 0.4.

Further, in the first representative embodiment, the retaining member 52 is attached to the housing 1 by snap-fit means having the engagement projection 60 and the engagement groove 54. Thus, the elastic material 50 can be easily attached to the housing 1.

2. Second Representative Embodiment

A second representative embodiment will now be explained with reference to FIGS. 14 to 20. The second representative embodiment is a modification of the first representative embodiment, in which the structure for mounting the retaining member 52 in the first representative embodiment has been modified. Therefore, with respect to the second representative embodiment, the mounting structure of the modified retaining member (numbered 72) is described in detail, while components identified by the same numerals as the first representative embodiment will not be described.

Figure 14:
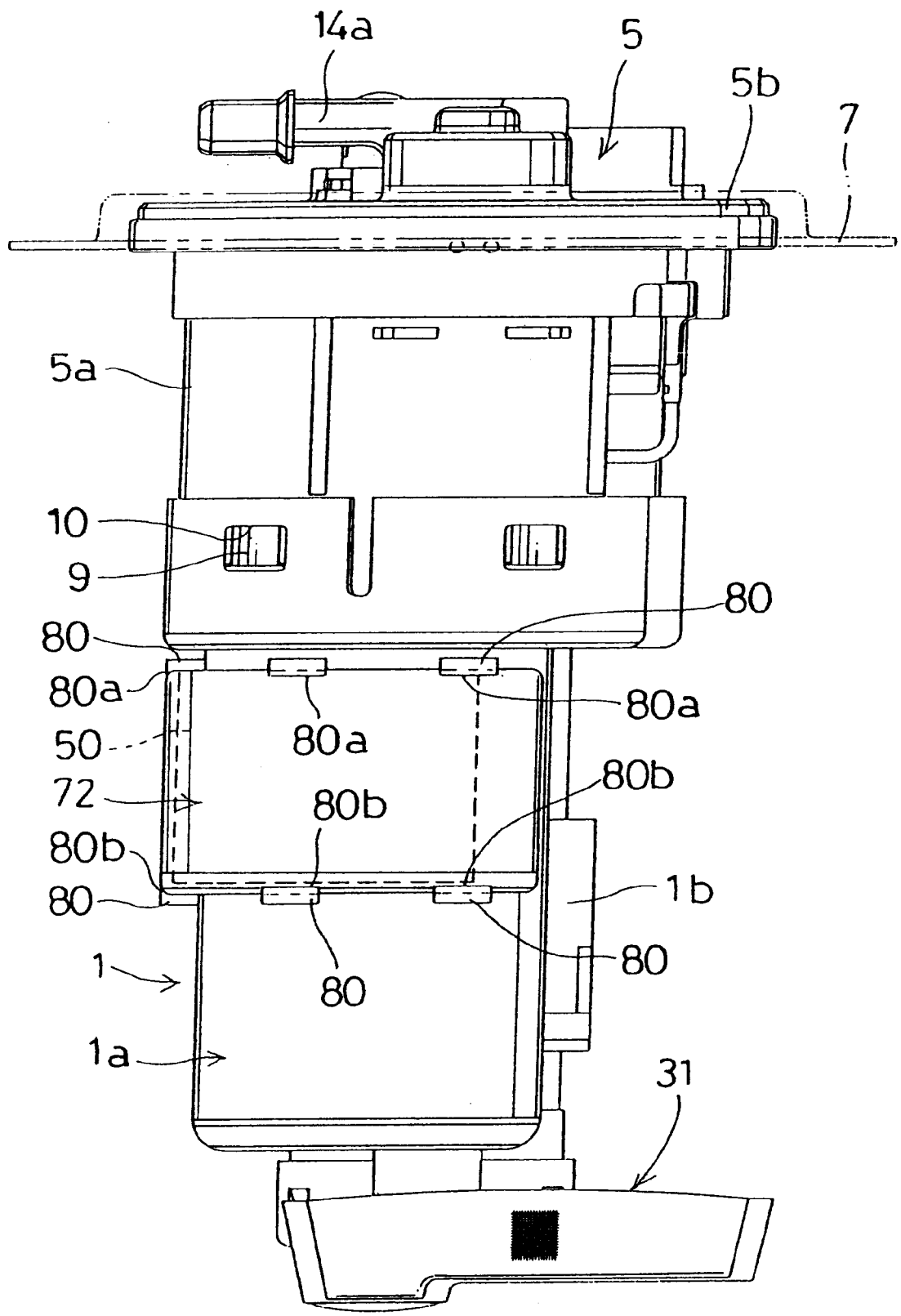
FIG. 14 is a front view showing a second representative embodiment.

FIG. 14 is a front view of a fuel supply system of the second representative embodiment. As shown in FIG. 14, the elastic material 50 (see FIG. 1) is retained on the outer peripheral surface of the upper portion of the housing body 1a of the housing 1 by the retaining member 72.

Figure 17:
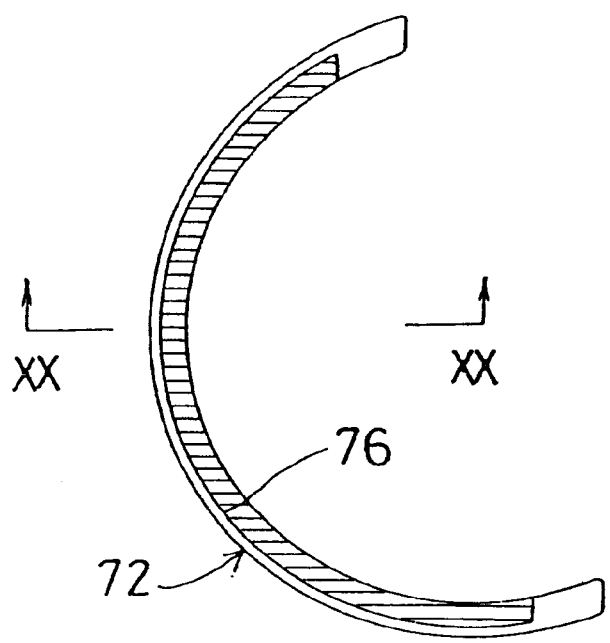
FIG. 17 is a plan view of a retaining member.
Figure 18:
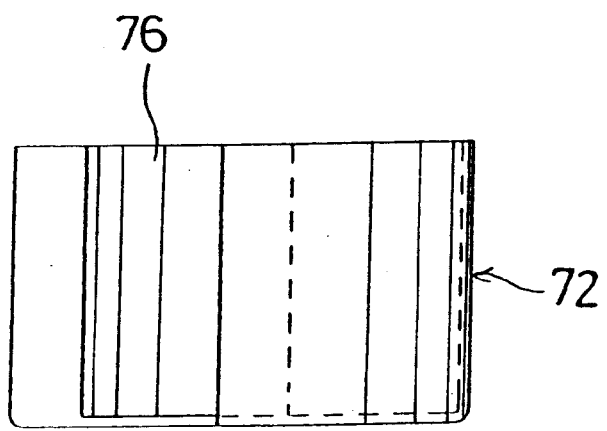
FIG. 18 is a right side view of the retaining member.
Figure 19:
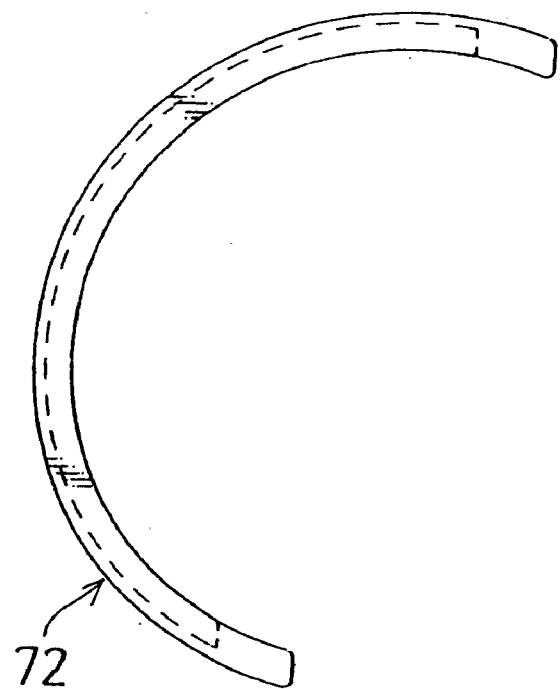
FIG. 19 is a bottom view of the retaining member.
Figure 20:
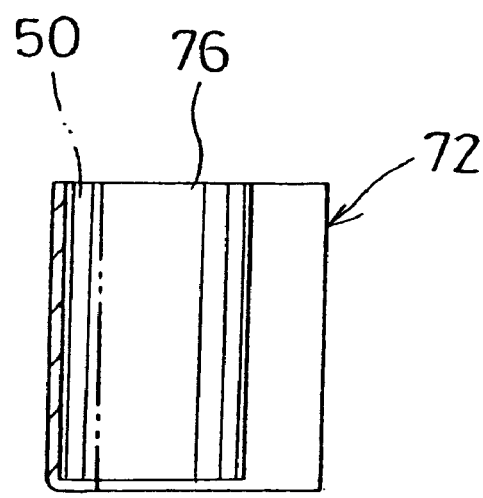
FIG. 20 is a sectional view taken along line XX—XX in FIG. 17.

FIG. 17 is a plan view of the retaining member 72, FIG. 18 is a right side view thereof, FIG. 19 is a bottom view thereof, and FIG. 20 is a sectional view taken along line XX—XX in FIG. 17. The retaining member 72 is preferably made of synthetic resin. Similar to the first representative embodiment, the retaining member 72 is preferably bent into a generally circular arc shape and is preferably formed into a generally rectangular plate-like shape. However, the engagement grooves 54 formed in the retaining member 52 in the first representative embodiment are not provided. A mounting recess 76, which is similar to the mounting recess 56 (see FIG. 8) in the first representative embodiment, is formed in the interior side of the retaining member 72 and serves to receive the elastic material 50 (see FIG. 1).

Figure 15:
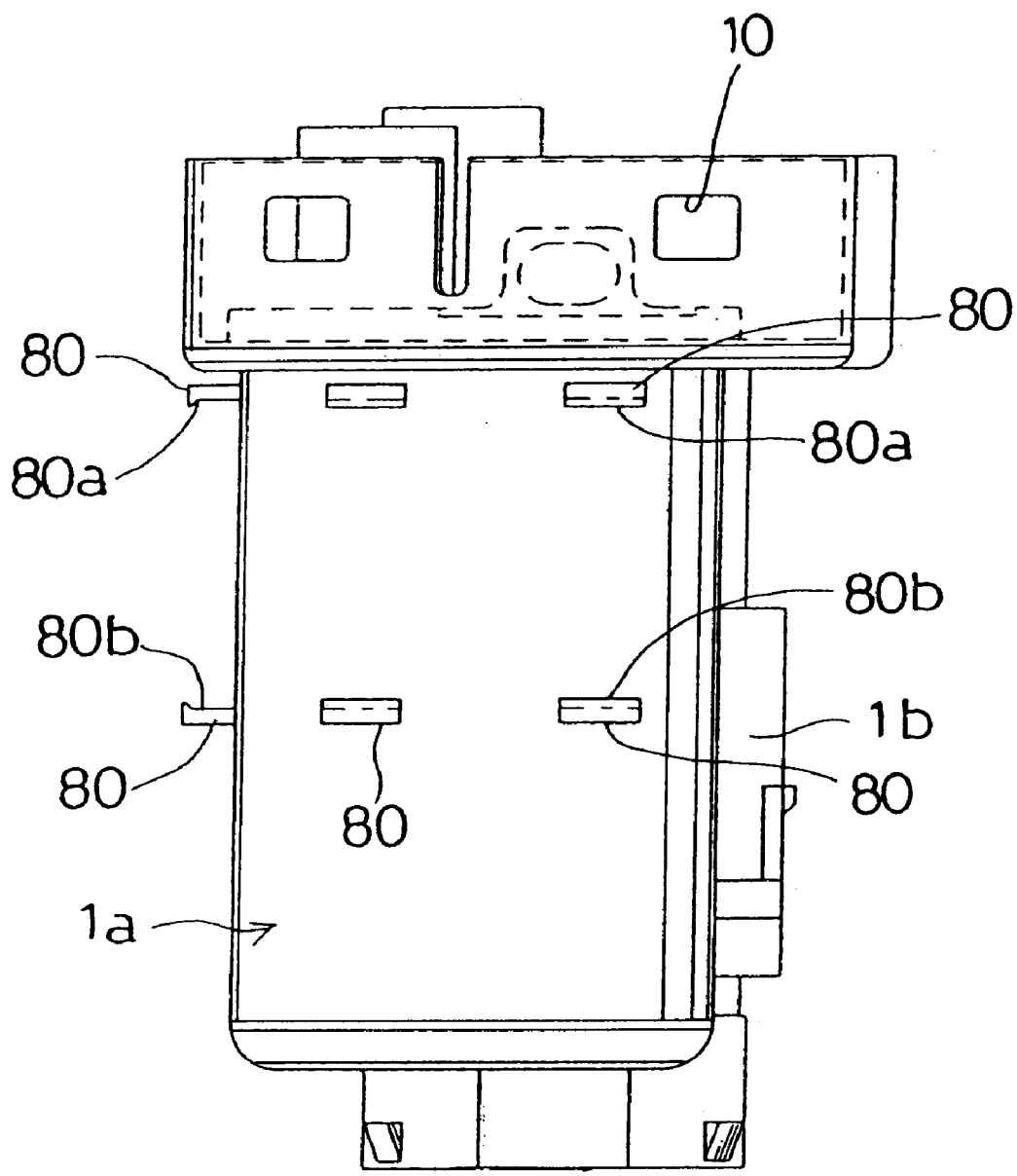
FIG. 15 is a front view of a housing body.
Figure 16:
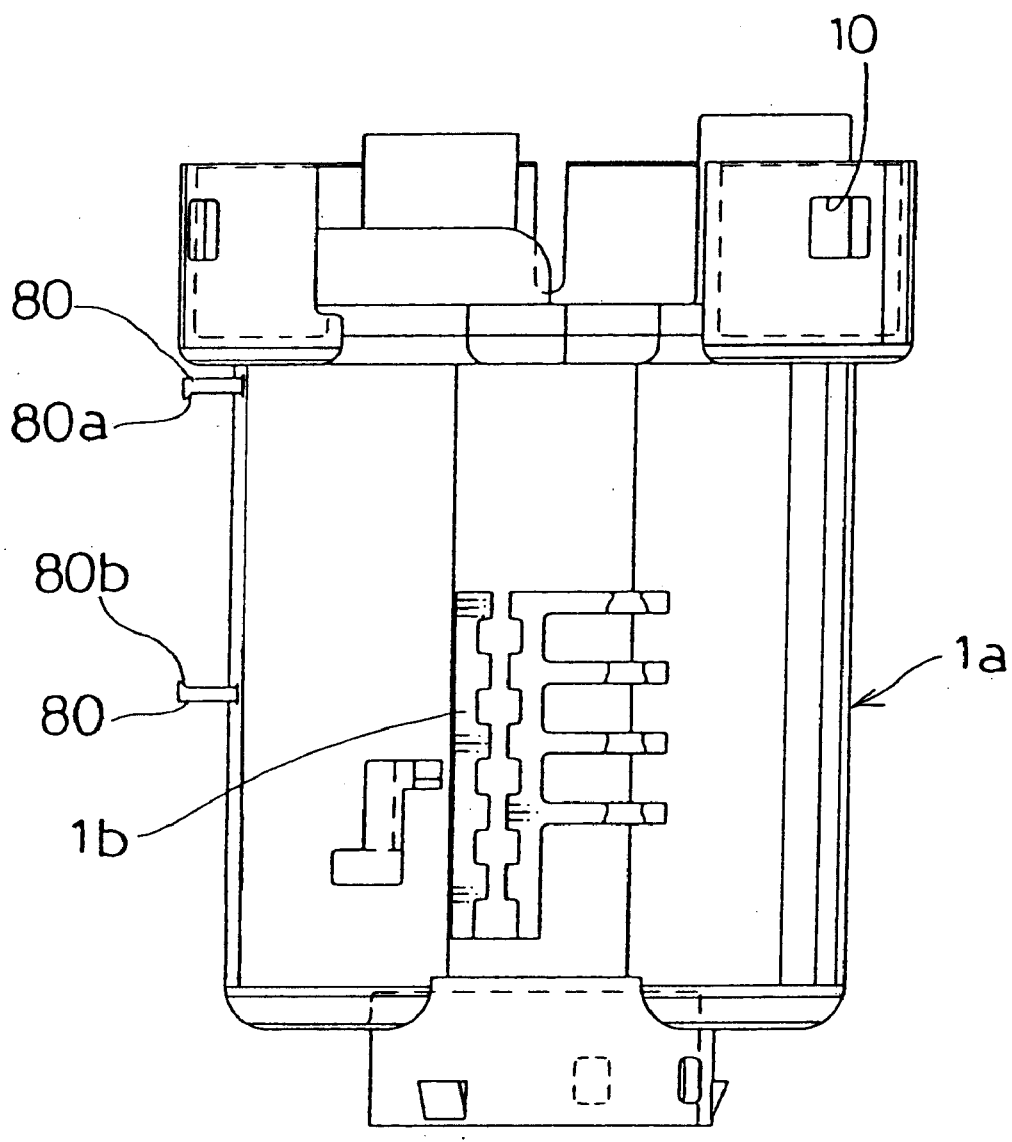
FIG. 16 is a right side view of the housing body.

The housing body 1a is constructed as described below so that the retaining member 72 can be attached to the housing body 1a. FIG. 15 is a front view of the housing body 1a, and FIG. 16 is a right side view thereof. Three pairs of upper and lower engagement projections 80 are integrally formed on the upper end portion of the housing body 1a. A first pair is formed on the outer surface near the right end on the front side, a second pair is formed on the outer surface near the left end on the front side and a third pair is formed on the outer surface generally in the center of the left side. Each of the upper engagement projections 80 has a claw 80a extending downwardly from the end thereof, and each of the lower engagement projections 80 has a claw 80b extending upwardly from the end thereof. The same materials as described with respect to the first representative embodiment may be used as the elastic material 50.

One representative procedure for attaching the elastic material 50 to the housing body 1a will now be explained. First, as in the first representative embodiment, the elastic material 50 is mounted in the mounting recess 76 of the retaining member 72. Next, the retaining member 72 to which the elastic material 50 has been mounted, is positioned close to and along the upper portion of the housing body 1a. As a result, the upper and lower engagement projections 80 elastically deform, and thus the claws 80a and 80b of the upper and lower engagement projections 80 engage the upper and lower edges of the retaining member 72 (see FIG. 14). The pairs of upper and lower engagement projections 80 and the upper and lower edges of the retaining member 72 form a representative snap-fastener.

By thus attaching the retaining member 72 to the housing body 1a, the elastic material 50 is attached to the housing body 1a (see FIG. 14). On the other hand, the retaining member 72 can be disengaged from the upper and lower engagement projections 80 when the retaining member 72 is moved away from the housing body 1a so that the upper and lower engagement projections 80 are elastically deformed.

Substantially the same effect as the first representative embodiment can be obtained by the fuel supply system of the second representative embodiment.

3. Third Representative Embodiment

A third representative embodiment will now be explained with reference to FIGS. 21 to 22, in which the structure for mounting the retaining member 52 in the first representative embodiment has been modified. Therefore, with respect to the third representative embodiment, the same components identified by the same numerals will not be described.

Figure 21:
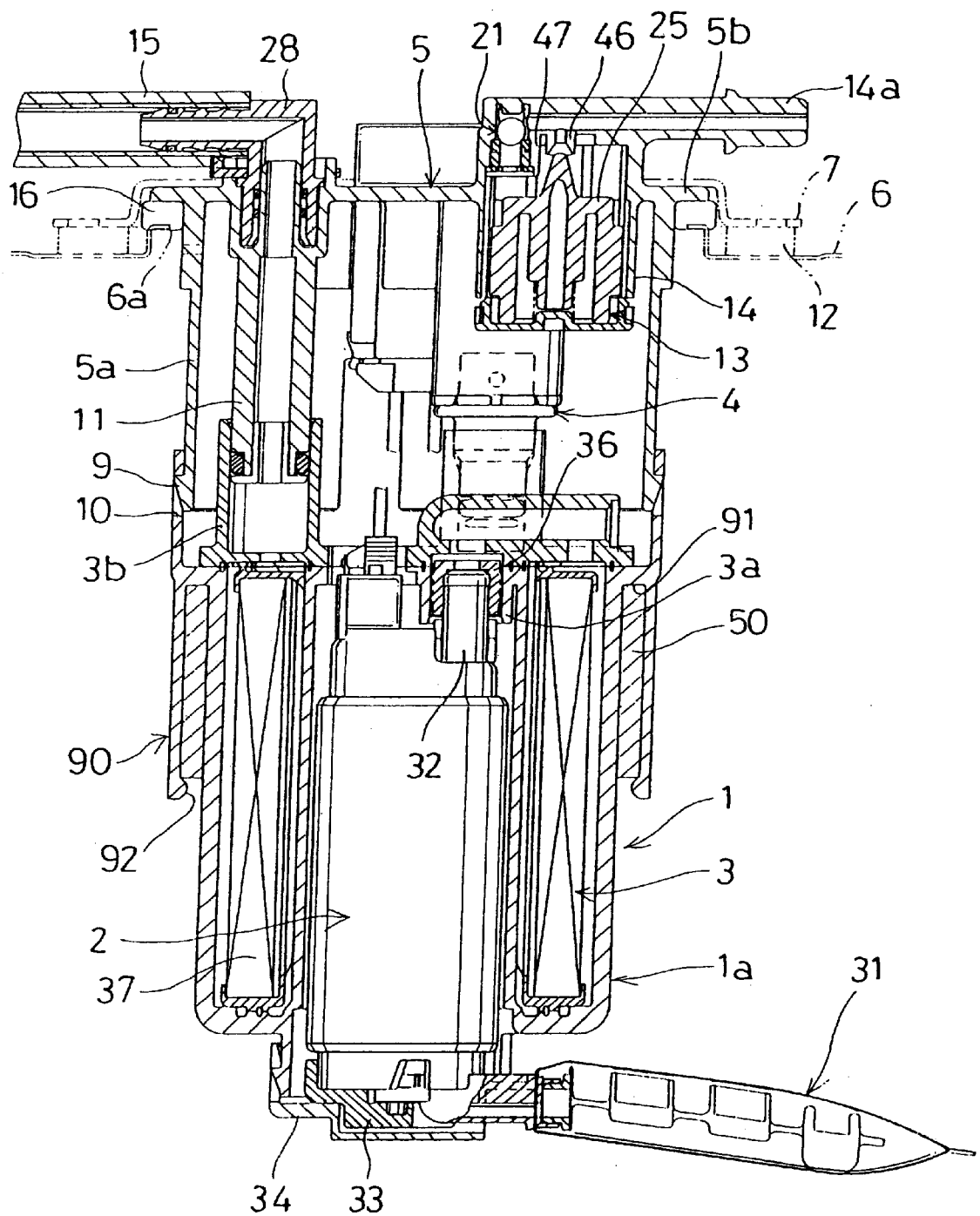
FIG. 21 is a sectional side view showing a third representative embodiment.
Figure 22:
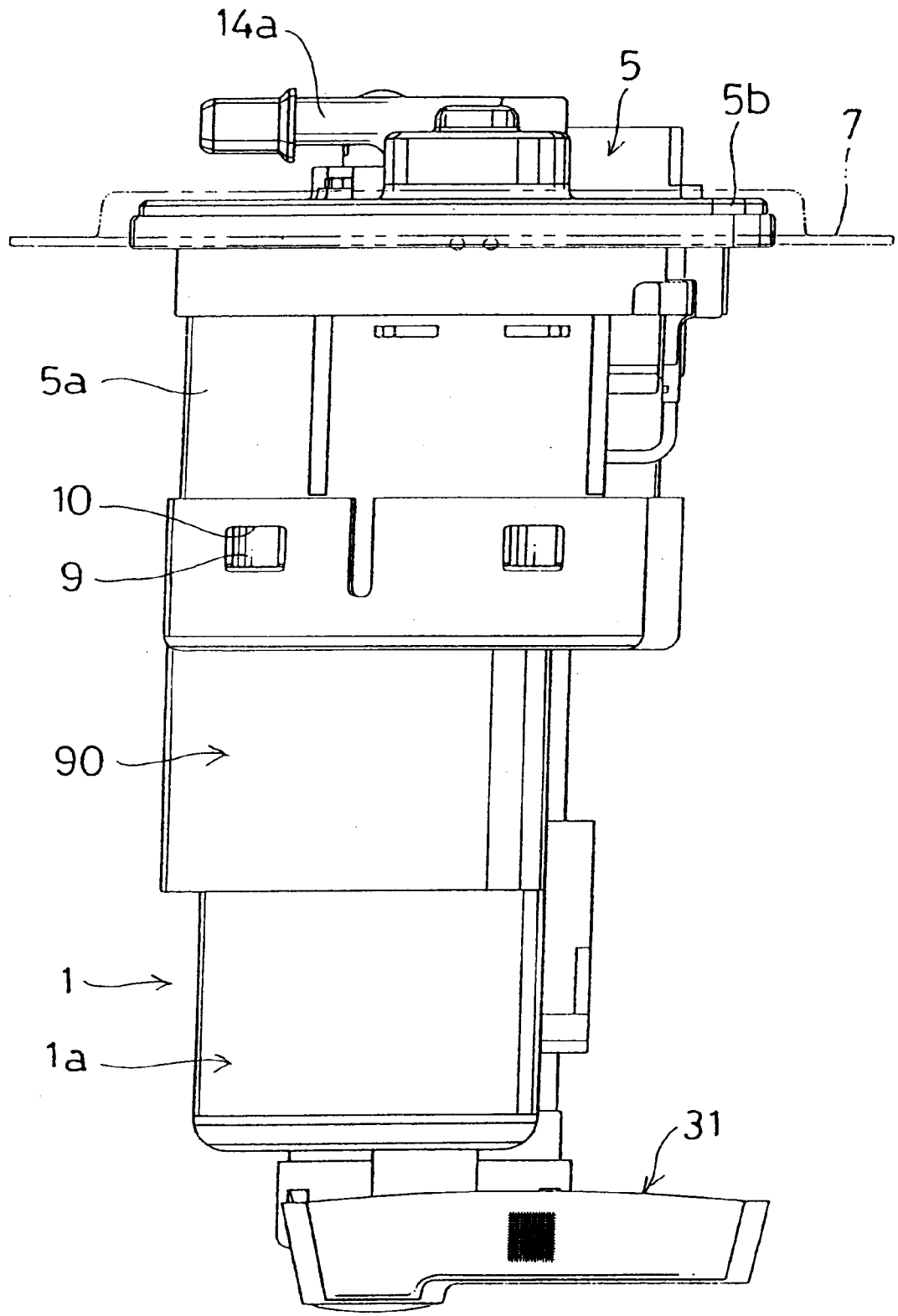
FIG. 22 is a front view of a fuel supply system.

FIG. 21 is a sectional side view of the third representative embodiment, and FIG. 22 is a front view thereof. A retaining portion 90 having a generally semicircular section is integrally formed on the outer peripheral surface of the upper portion of the housing body 1a of the housing 1 and at a location corresponding to the retaining member 52 of the first representative embodiment. As shown in FIG. 21, a retaining groove 91 is defined between the retaining portion 90 and the housing body 1a and is open at the lower end. A projection or projections 92 are formed on the lower edge portion continuously or spaced apart from each other in a circumferential direction, in a manner to reduce the opening width of the retaining groove 91.

When the elastic material 50 is inserted through the lower opening of the retaining groove 91, the retaining portion 90 is elastically deformed, and thus the elastic material 50 is inserted into the retaining groove 91. As a result, the elastic material 50 is retained on the housing body 1a. The elastic material 50 is prevented from being removed by the projections 92. The same materials as described with respect to the first representative embodiment may be used as the elastic material 50.

Substantially the same effect as the first and second representative embodiments can be obtained by the fuel supply system of the second representative embodiment as well. The retaining groove 91 may be constructed to have an open top through which the elastic material 50 is inserted into the retaining groove 91. In this case, the open top of the retaining groove 91 is preferably closed by means of the bracket 5.

4. Fourth Representative Embodiment

A fourth representative embodiment will now be explained with reference to FIGS. 23 to 30. In the fourth representative embodiment, instead of the elastic material 50 used in the first to third representative embodiments, fuel resistant paper material 150 is preferably used as the damping material. The structures for mounting the elastic material 50 in the first to third representative embodiments can be utilized with the structure for mounting the damping material 150 to the housing 1. Therefore, with respect to the fourth representative embodiment, only the damping material 150 will be described in further detail, because the other aspects of the fourth embodiment are the same as the first to third representative embodiments.

Figure 23:
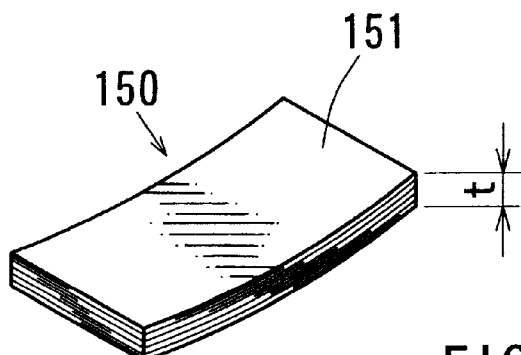
FIG. 23 is a perspective view of a damping material that is used in a fourth representative embodiment.

FIG. 23 is a perspective view of a representative fuel-resistant paper material 150 (hereinafter simply "paper material"). In this embodiment, filter paper 151 that is ordinarily used to filter fuel is used as the paper material. However, other fuel-resistant paper materials may be used as the paper material 150. Filter paper 151 may be formed by impregnating a base paper with a resin, such as a phenol resin or an alkyl resin, and then heat-treating the impregnated paper to harden the resin. A plurality of filter paper sheets 151 may be superimposed one on another to thereby form a paper material 150 (damping material) having a thickness t. For example, if filter paper 151 having a thickness of 0.3 mm is used, preferably about 12 to 18 sheets of the filter paper 151 are superimposed one on another.

Changes in tank vibrations were measured for paper materials 150 having various thickness. These measurements were conducted in the same manner as the above-described tank vibration measurements. Specifically, tank vibrations were measured for paper materials 150 having varying thickness (which are formed by varying the number of superimposed sheets of the filter paper 151) and the paper materials 150 were mounted at measurement position B (see FIG. 10).

Figure 24:
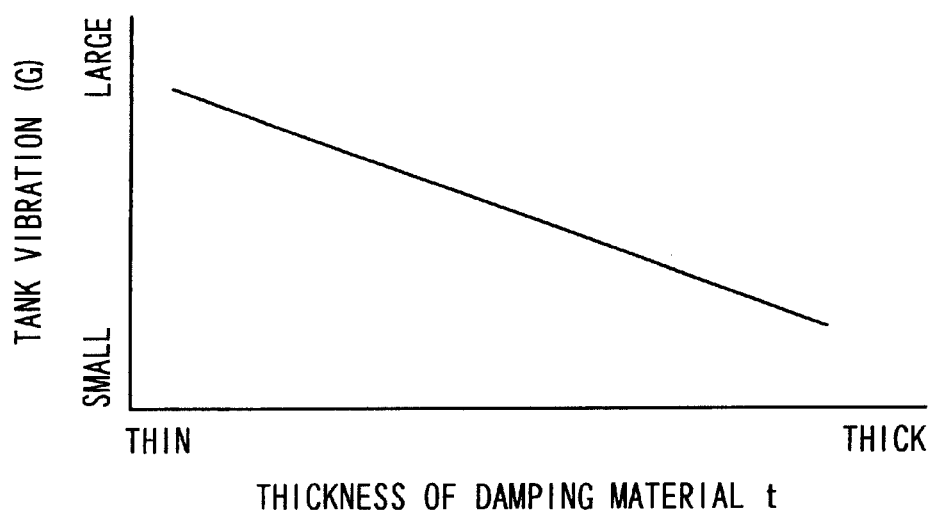
FIG. 24 shows the relationship between tank vibrations and damping material (i.e. filter paper) thickness.

The measurement results are shown in FIG. 24. In FIG. 24, the abscissa represents the thickness t of the paper material 150 and the ordinate represents the vibration level (G) of tank vibrations. As clearly shown in FIG. 24, the vibration reducing effect is small when the paper material 150 is thinner and the vibration reducing effect is large when the paper material 150 is thicker. Therefore, by increasing the number of superimposed sheets of filter paper 151, the vibration reducing effect on the fuel tank 6 is increased.

Figure 25:
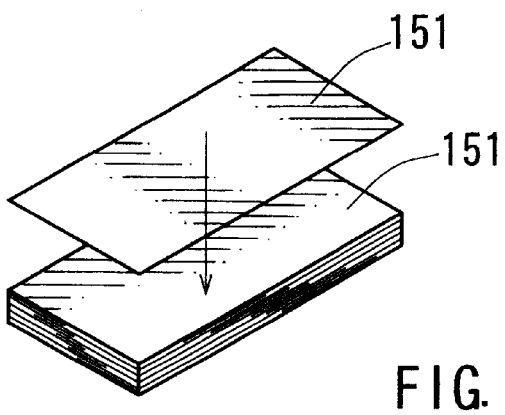
FIG. 25 is a perspective view showing a first example of superimposing the filter paper to form the damping material.
Figure 26:
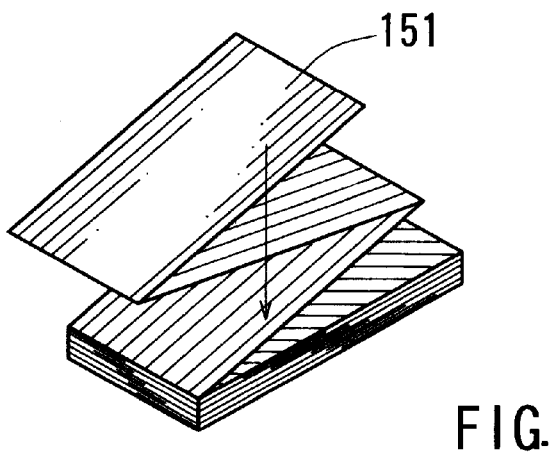
FIG. 26 is a perspective view showing a second example of superimposing the filter paper to form the damping material.
Figure 27:
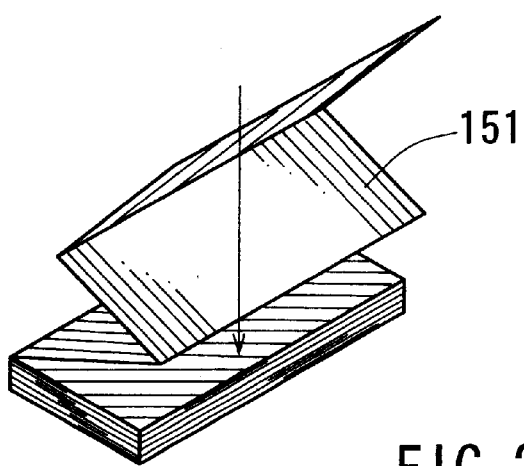
FIG. 27 is a perspective view showing a third example of superimposing the filter paper to form the damping material.

Representative methods for superimposing the filter paper 151 to form the damping material will be provided. FIG. 25 shows a first example, in which the filter paper 151 is cut into sheets of a predetermined dimension and the sheets of the filter paper 151 are superimposed one on another. FIG. 26 shows a second example, in which the filter paper 151 that has a longitudinally elongated, belt-like shape and is alternately folded a number of times to form a lamination. FIG. 27 shows a third example, in which the filter paper 151 has a laterally elongated, belt-like shape and is alternately folded a number of times to form a lamination.

Figure 28:
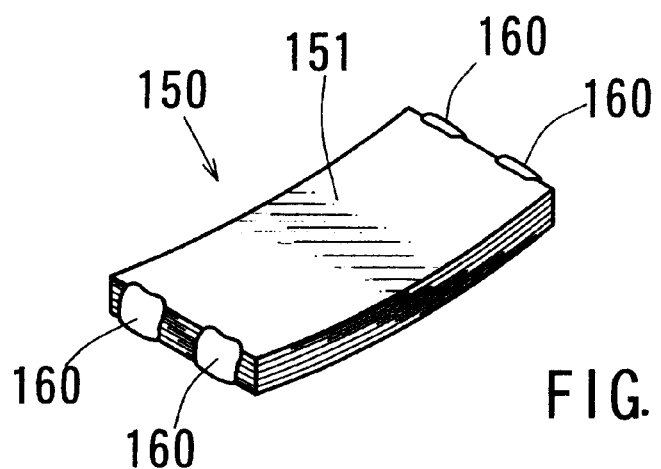
FIG. 28 is a perspective view showing a first example of joining the filter paper to form the damping material.
Figure 29:
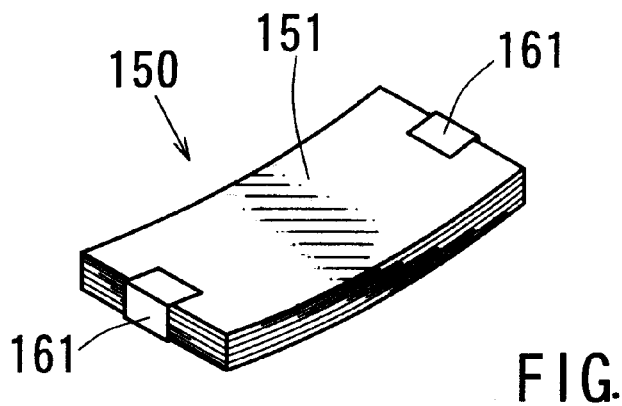
FIG. 29 is a perspective view showing a second example of joining the filter paper to form the damping material.
Figure 30:
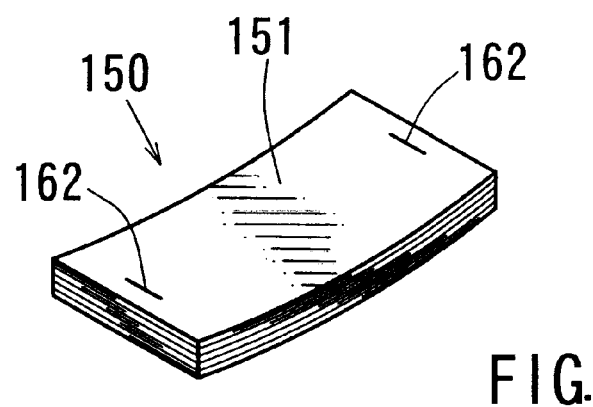
FIG. 30 is a perspective view showing a third example of joining the filter paper to form the damping material.

The superimposed filter paper 151 is preferably integrated into one paper material 150 to minimize parts management and increase assembling efficiency. Representative methods for integrating the superimposed filter paper 151 into a single paper material 150 will be provided. FIG. 28 shows a first example, in which the edge end of the superimposed filter paper 151 is joined by adhesives 160. FIG. 29 shows a second example, in which the edge end of the superimposed filter paper 151 is joined by clips 161. FIG. 30 shows a third example, in which the edge end of the superimposed filter paper 151 is joined by using a stapling device such as a stapler. Staples 162 are shown in FIG. 30.

Substantially the same effect as the first to third representative embodiments can be also obtained by providing the above-described paper material 150 on the side wall of the housing of the first to third representative embodiments. Further, the fuel resistant paper materials generally are less expensive than elastic materials, such as rubber foam, and using fuel-resistant paper materials can reduce the cost of the damping material.

Known filter papers used in fuel filter are widely used and the performance characteristics of such fuel resistant materials are well understand. Moreover, such known filter papers have been proven to be fuel-resistant. Thus, such known filter paper material will help to enhance the durability of the damping material for the present invention.

If an elastic material such as rubber foam is used as the damping material, such damping material may expand or contract when disposed in substandard fuel. Moreover, the expansion and contraction properties of the elastic material tend to change over time. On the other hand, the properties of known fuel-resistant filter paper materials do not change very much over time and are thus highly durable.

The present invention is not limited to the constructions that have been described as the representative embodiments, but rather, various modifications, additions or deletions may be made without departing from the spirit and scope of the invention. For example, the fuel supply system may be any type of fuel supply system in which the fuel pump 2 is disposed within the housing 1. Specifically, the fuel filter 3, the pressure regulator 4, the fuel cutoff valve 13 or other components may be included or omitted, or additional components may be provided. The shapes and materials of the housing body 1a of the housing 1 and the bracket 5 are not limited to those of the above-described embodiments. The damping material is not limited to the elastic material 50 in the first to third representative embodiments or the paper material 150 in the fourth representative embodiment, but rather, may be any material that provides a vibration reducing effect.

Further, poreless rubber may be used instead of rubber foam as the elastic material 50. The elastic material 50 or the paper material 150 may be attached to the housing body 1a by adhesion, without using the retaining member 52 or 72 or the retaining portion 90. The elastic material 50 or the paper material 150 may be provided in a manner so as to cover the entire housing 1 or in a dispersed manner around the housing 1. The shapes and the mounting positions of the elastic material 50 or the paper material 150 are not limited. The elastic material 50 or the paper material 150 may be provided on the inner peripheral surface (which faces the fuel pump 2) of the housing body 1a. The elastic material 50 or the paper material 150 may be provided on the outer peripheral surface and/or the inner peripheral surface of the side wall (the cylindrical engagement portion 5a) of the bracket 5. The elastic material 50 or the paper material 150 may be embedded in the side wall of the housing body 1a and/or the side wall (the cylindrical inserting portion 5a) of the bracket 5. Disposing the elastic material 50 or the paper material 150 at the location on the housing 1 where the vibrations of the housing 1 are the largest can effectively reduce tank vibrations. Therefore, the mounting position of the elastic material 50 or the paper material 150 is properly changed according to the construction and the mounting position of the fuel pump 2 that is mounted in the housing 1.

Further, the mounting position of the attachment means is not limited to the side wall of the housing body 1a, but rather, the attachment means may be provided on the bracket 5. The positional relation of the engagement projections 60 and the engagement grooves 54 may be reversed. Specifically, the engagement projections 60 may be provided on the retaining member 52, while the engagement grooves 54 may be provided in the housing body 1a. The attachment means may be any type fastener that elastically engages the housing 1. Thus, the shape, type and number of attachment means are not limited.

What is claimed is:

1. A fuel supply system, comprising:

a fuel pump housing, a fuel pump disposed within the fuel pump housing, a fuel tank, wherein the fuel pump and fuel pump housing are disposed within the fuel tank, and a damping material disposed on a sidewall of the housing, wherein the damping material comprises a fuel-resistant paper material.

2. A fuel supply system as in claim 1, wherein the fuel-resistant paper material is fuel filter paper.

3. A fuel supply system as in claim 1, wherein the damping material is formed by superimposing a plurality of sheets of the fuel-resistant paper material one on another to form a lamination.

4. A fuel supply system as in claim 1, wherein the damping material is formed by folding a single sheet of the fuel-resistant paper material a number of times to form a lamination.

5. A fuel supply system as in claim 1, wherein the damping material is disposed at a location of the housing in which housing vibrations are the largest.

6. A fuel supply system as in claim 5, wherein the fuel pump housing is secured to the fuel tank.

7. A fuel supply system as in claim 6, wherein a bracket is mounted on an upper end portion of the housing and is secured to the fuel tank.

8. A fuel supply system as in claim 5, wherein a fuel filter is disposed within the fuel pump housing.

9. A fuel supply system as in claim 5, further comprising a retaining member, wherein the damping material is retained against the side wall of the housing by the retaining member.

10. A fuel supply system as in claim 9, wherein the retaining member has a mounting recess for mounting the damping material on the housing.

11. A fuel supply system as in claim 10, further comprising a snap-fastener that mounts the retaining member on the side wall of the housing.

12. A fuel supply system as in claim 1, wherein the fuel pump is vertically disposed within the housing along an inner periphery thereof, and wherein the damping material is disposed around an upper end portion of the housing.

13. A vehicle comprising:
a fuel supply system of claim 1 and
an internal combustion engine coupled to the fuel supply system of claim 1.

14. A fuel supply system arranged and constructed for use within a fuel tank, comprising:
a fuel pump housing having a sidewall defined when the fuel pump housing is disposed in a generally vertical orientation,
a fuel pump disposed within the fuel pump housing and
a damping material disposed on the sidewall of the housing, wherein the damping material comprises a fuel-resistant paper material.

15. A fuel supply system as in claim 14, wherein the fuel-resistant paper material is fuel filter paper.

16. A fuel supply system as in claim 14, wherein the damping material is formed by superimposing a plurality of sheets of fuel-resistant paper material one on another to form a lamination.

17. A fuel supply system as in claim 14, wherein the damping material is formed by folding a single sheet of fuel-resistant paper material a plurality of times to form a lamination.

18. A fuel supply system as in claim 14, wherein the fuel-resistant paper material comprises a base paper impregnated with a resin, wherein the impregnated paper has been heat treated to harden the resin.

19. A fuel supply system as in claim 14, wherein the damping material comprises about 12–18 sheets of filter paper having a thickness of 0.3 mm superimposed on each other.

20. A fuel supply system as in claim 14, wherein the damping material comprises a plurality of sheets of fuel-resistant paper superimposed on each other to form a lamination and the fuel supply system further comprises a retaining member, wherein the retaining member retains the damping material against the side wall of the housing.

21. A fuel supply system as in claim 20, wherein the retaining member has a mounting recess for mounting the damping material on the housing.

22. A fuel supply system as in claim 21, further comprising a snap-fastener that mounts the retaining member on the side wall of the housing.

23. A fuel supply system as in claim 22, wherein the fuel pump is vertically disposed within the fuel pump housing along an inner periphery thereof, and the damping material is disposed around an upper end portion of the fuel pump housing.

24. A fuel supply system as in claim 23, wherein the damping material is substantially C-shaped in cross-section.

25. A fuel supply system as in claim 24, wherein the fuel pump housing comprises a resin material selected from polyoxymethylene resin, polyphenylene sulfido resin and polyamide resin.

26. A fuel supply system as in claim 24, wherein the fuel pump housing comprises engagement projections, the retaining member comprises engagement grooves that receive the engagement projections and the damping material is disposed between the retaining member and the fuel pump housing.

27. A fuel supply system as in claim 24, wherein the fuel pump housing comprises upper and lower engagement projections having claws, wherein upper and lower edges of the retaining member are received between the upper and lower engagement projections and the damping material is disposed between the retaining member and the fuel pump housing.

28. A fuel supply system as in claim 24, wherein a retaining portion extends from the fuel pump housing and the fuel resistant paper material is disposed within a retaining groove defined between the retaining portion and the fuel pump housing.

29. A fuel supply system as in claim 27, wherein an inwardly facing projection is formed on a lower edge of the retaining portion.

30. A fuel supply system arranged and constructed for use within a fuel tank, comprising:
a fuel pump housing having a sidewall defined when the fuel pump housing is disposed in a generally vertical orientation,
a fuel pump disposed within the fuel pump housing and
means for retaining a fuel-resistant paper material between the fuel pump housing and the retaining means, the fuel-resistant paper material being provided in a quantity that reduces vibrations generated by the fuel pump during operation.

31. A fuel supply system as in claim 30, wherein the fuel pump housing comprises engagement projections and the retaining means comprises engagement grooves that receive the engagement projections.

32. A fuel supply system as in claim 30, wherein the fuel pump housing comprises upper and lower engagement projections having claws and upper and lower edges of the retaining means are received between the upper and lower engagement projections.

33. A fuel supply system as in claim 30, wherein the retaining means extends from the fuel pump housing and the fuel resistant paper material is disposed within a retaining groove defined between the retaining means and the fuel pump housing.

34. A fuel supply system as in claim 33, wherein an inwardly facing projection is formed on a lower edge of the retaining means.

35. A fuel supply system as claim 30, wherein the fuel-resistant paper material comprises a plurality of superimposed sheets of fuel-resistant filter paper.

36. A fuel supply system as in claim 35, wherein each sheet of fuel-resistant paper comprises a base paper impregnated with a resin, wherein the impregnated paper has been heat treated to harden the resin.

37. A fuel supply system as in claim 35, wherein about 12 to 18 sheets of fuel-resistant filter paper are superimposed and each sheet has a thickness of about 0.3 mm.

38. A fuel supply system as claim 35, wherein the fuel pump is vertically disposed within the fuel pump housing along an inner periphery thereof, and the superimposed sheets are disposed substantially entirely around an upper end portion of the fuel pump housing.

39. A fuel supply system as in claim 38, wherein the fuel pump housing has a cylindrical shape in cross-section and the superimposed sheets have a substantially C-shape in cross-section that conforms to cylindrical shape of the fuel pump housing.

40. A fuel supply system as claim 30, wherein the fuel resistant paper material comprises a single sheet of fuel-resistant paper material folded a plurality of times.

41. A fuel supply system as in claim 40, wherein the fuel-resistant paper comprises a base paper impregnated with a resin, wherein the impregnated paper has been heat treated to harden the resin.

42. A fuel supply system as in claim 40, wherein the sheet has a thickness of about 0.3 mm and has been folded about 12 to 18 times.

43. A fuel supply system as claim 40, wherein the fuel pump is vertically disposed within the fuel pump housing along an inner periphery thereof, and the superimposed sheets are disposed substantially entirely around an upper end portion of the fuel pump housing.

44. A fuel supply system as in claim 43, wherein the fuel pump housing has a cylindrical shape in cross-section and the superimposed sheets have a substantially C-shape in cross-section that conforms to cylindrical shape of the fuel pump housing.

* * * * *